P. B. SULLIVAN.
ACETYLENE GAS GENERATING APPARATUS.
APPLICATION FILED AUG. 16, 1917.
1,315,051.
Patented Sept. 2, 1919.
2 SHEETS—SHEET 1.
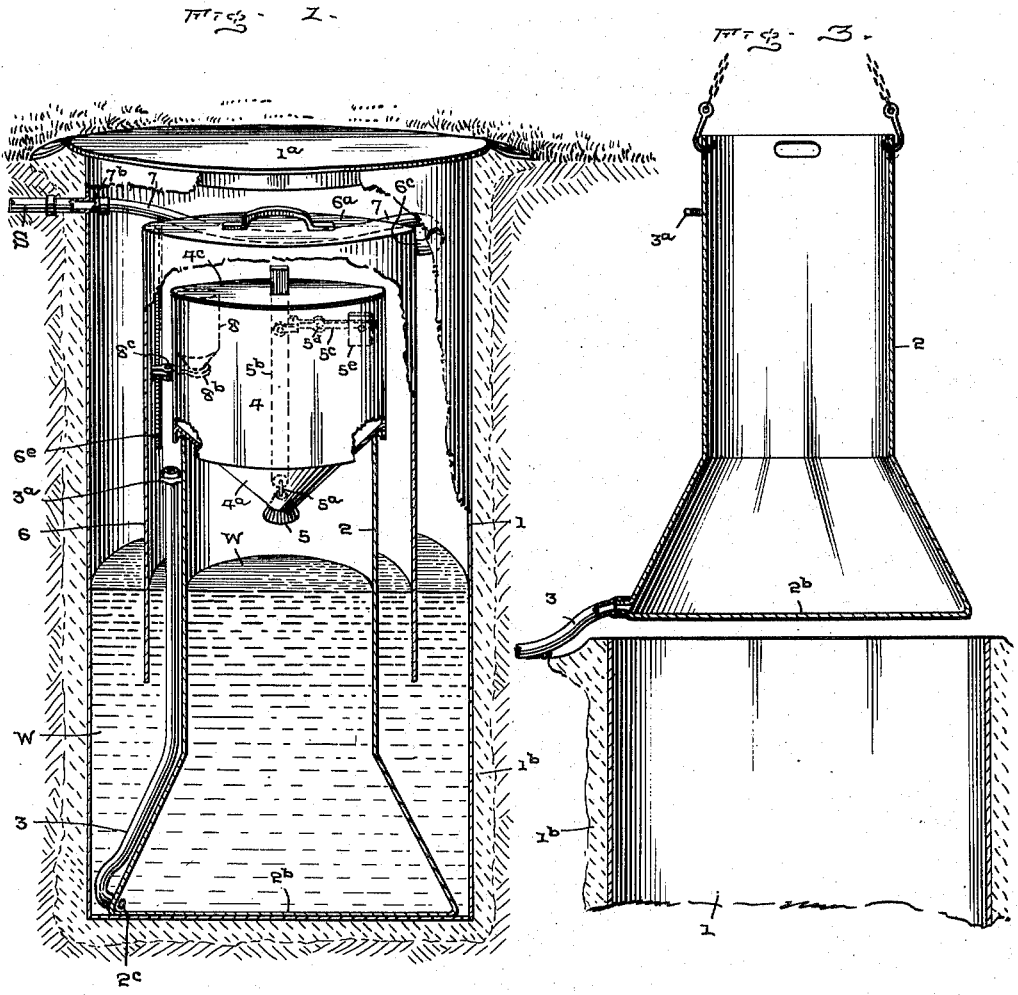
Inventor
Percy B. Sullivan
By Alexander Dowell
Attorneys

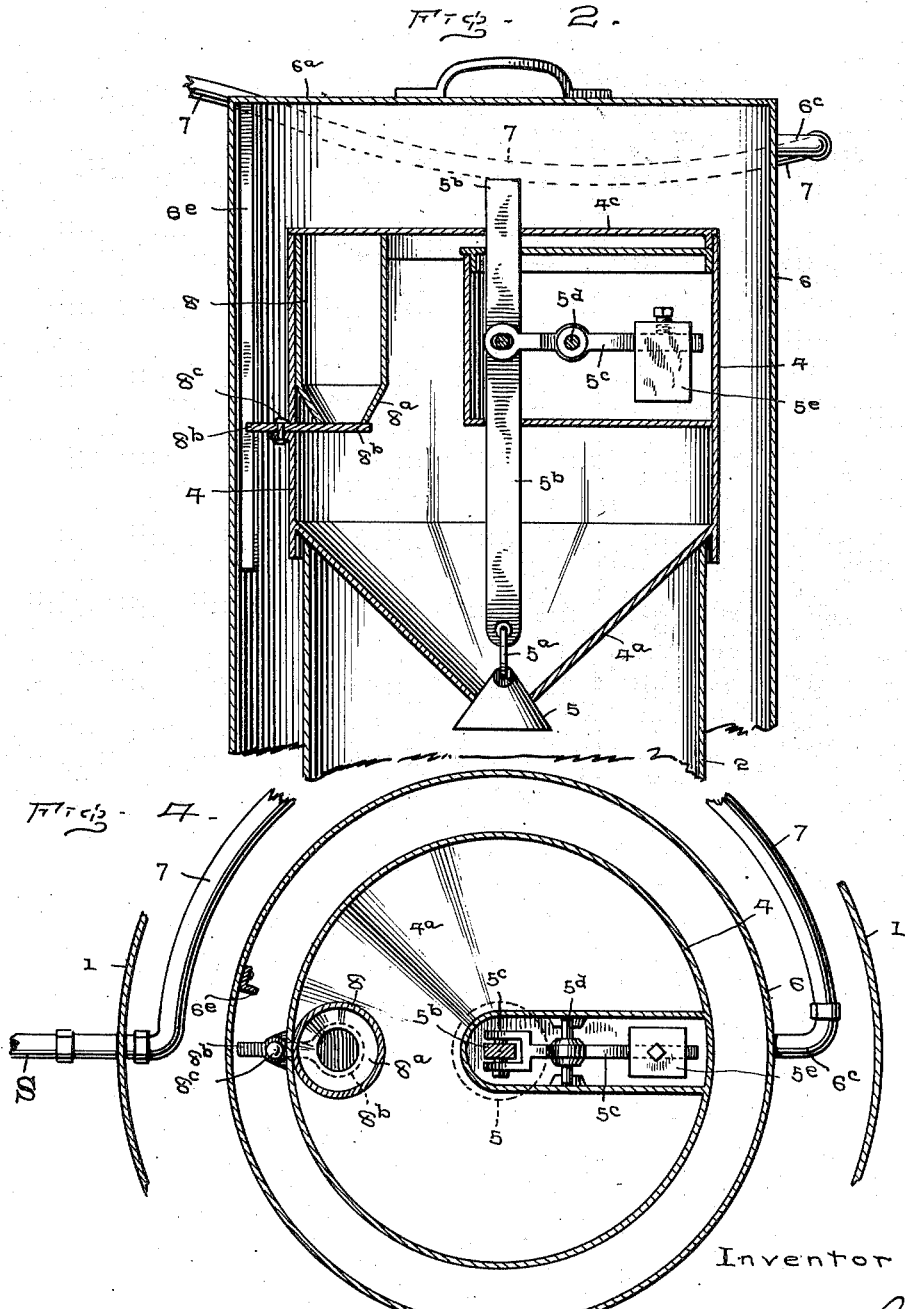

UNITED STATES PATENT OFFICE.

PERCY B. SULLIVAN, OF DECATUR, ILLINOIS.

ACETYLENE-GAS-GENERATING APPARATUS.

1,315,051. Specification of Letters Patent. Patented Sept. 2, 1919.

Application filed August 16, 1917. Serial No. 186,561.

*To all whom it may concern:*

Be it known that I, PERCY B. SULLIVAN, a citizen of the United States, residing at Decatur, in the county of Macon and State of Illinois, have invented certain new and useful Improvements in Acetylene-Gas-Generating Apparatus; and I hereby declare that the following is a full, clear, and exact description thereof, reference being had to the accompanying drawings, which form part of this specification.

This invention relates to apparatus for producing carbid gas, and is a novel apparatus to be used for producing such gas for supplying a dwelling house and the like.

The objects of the invention are (*a*) to provide a novel means for automatically feeding the carbid when the amount of gas in the bell or holder drops to a predetermined minimum point; (*b*) to provide novel means for connecting the gas bell with the service pipes so that connections will be above water and free from liability to become clogged by water or carbid powder without interfering with the desired freedom of movement of the gas bell; (*c*) to provide novel means whereby the carbid sludge or mud may be readily and quickly discharged from the apparatus when it is desired to clean the same; and (*d*) to provide a novel supplemental carbid supply whereby when the main supply is exhausted the generator may be enabled to operate for a short period of time before recharging.

I will explain the invention in connection with the accompanying drawings which illustrates one form of an apparatus embodying the several features of my invention, and which will enable others to adopt and use the same; and in the claims I have summarized the novel features of construction and combination of parts for which protection is desired.

In the drawings—

Figure 1 is a partial sectional elevation of one form of carbid gas generating apparatus embodying the invention.

Fig. 2 is an enlarged detail sectional view of the carbid feeding devices.

Fig. 3 is a detail sectional view illustrating the manner of discharging the spent carbid mud or sludge from the holder.

Fig. 4 is a transverse sectional view of Fig. 2.

The apparatus indicated in the drawings comprises a water-tight holder or tank 1, which may be of any suitable construction, but is preferably made of metal, and provided with a removable cover $1^a$. This tank is preferably buried in the ground and may be surrounded and reinforced by concrete $1^b$ as indicated in the drawings.

Within this tank is a removable cylindric diaphragm or container 2, which is open at its upper end, and its lower end is preferably enlarged and closed by a water-tight bottom $2^b$. Near the bottom $2^b$ is a discharge opening $2^c$ to which is suitably connected the lower end of a discharge pipe or hose 3, which pipe is preferably adapted to be normally raised to a vertical position and folded against the side of the container, as indicated in Fig. 1, and said discharge pipe may be retained in normal position by means of any suitable catch or fastener, indicated at $3^a$, attached to the container near its upper end and above the water level in the tank, so that normally the free end of the discharge pipe 3 is above the water level. This discharge pipe is to be used as hereinafter described; and while I preferably make it out of hose, other suitable connected piping may be employed.

Preferably removably mounted above and upon the upper end of the container 2 is a feed hopper 4, adapted to contain carbid, and preferably having a conical bottom $4^a$ provided with a central opening for the escape of carbid. This opening is normally closed by a conical self-adjusting valve 5 which is suitably loosely connected at its apex (preferably by a link $5^a$) to the lower end of a rod $5^b$, so that said valve is universally movable relative to the rod and its seat and can readily automatically adjust itself to the seat as hereinafter explained. The rod $5^b$ is pivotally connected to the inner end of a lever $5^c$, which is pivoted on a rod $5^d$ within the hopper, and is provided with a weight $5^e$ on its free end by which the lever is caused to hold valve 5 normally closed. Rod $5^b$ projects above the level $5^c$ and above the top $4^c$ of the hopper 4, which top may be of any suitable construction. The lever and upright are preferably housed, as shown, so that the carbid will not prevent the proper action thereof.

Within the tank 1 is a movable gas bell 6 which is open at its lower end and incloses the hopper 4 and the upper end of the container 2. The space between the lower part of the container and the tank is partly filled with water W, so that the lower end of the bell is submerged in the water, and sealed thereby. The upper end of the bell is gas-tightly closed by a head 6ª. The interior of the bell forms a gas-retaining chamber in the usual manner.

A suitable amount of water is placed in the container 2; and a supply of carbid is placed in the hopper 4; and sufficient carbid is dropped into the container to produce enough gas to lift the bell and maintain the desired supply of gas.

Normally the gas will raise the bell 6 so that its head 6ª will not contact with the upper end of the rod 5ᵇ; but as gas is withdrawn from the bell it descends and as the gas becomes exhausted the head of the bell eventually engages and depresses the rod 5ᵇ and opens the valve 5.

As the valve 5 is loosely hung so as to be universally movable, as stated, on the rod 5ᵇ, a very slight downward movement of the rod 5ᵇ will cause said valve to shift and allow sufficient carbid to escape from the hopper into the container to generate the requisite additional gas. Valve 5 being loosely connected to the rod will automatically adjust itself in closing the opening in the hopper; and when the rod is jarred or depressed very slightly the valve will admit a small quantity of the carbid into the container; this renders the feed very sensitive, and practically only such an amount of carbid will be admitted into the container as is required to maintain the proper supply of gas; and according to the number of burners which may be in operation at any given time.

To provide an auxiliary supply of carbid in case the supply in hopper 4 becomes exhausted before the owner is ready to replenish it, or when it is not convenient to immediately replenish it, I provide within hopper 4 an auxiliary hopper 8, preferably provided with a conical bottom 8ª and having an outlet closed by a valve, which may be a slide valve 8ᵇ pivoted at 8ᶜ on the side of the hopper 4 and having one end projecting out of the hopper as shown, said valve 8ᵇ being normally closed. To the inner side wall of the bell 6 I attach a rib 6ᵉ which, by partly rotating the bell, can be caused to engage the outer end of the valve 8ᵇ and thus open said valve.

The auxiliary hopper 8 can contain about a gallon of carbid, and should be filled when the hopper 4 is filled, valve 8 being closed. When the carbid in hopper 4 is used up the failure of the supply will be noted by the failure of the gas at the burners; and if this happens at a time when it is not convenient to refill the hopper 4, for example at night, the owner can go to the apparatus and remove cover 1ª, and reach down and partly turn the bell 6 to engage and open valve 8ᵇ, allowing the carbid in the auxiliary hopper to escape into the main hopper, and the supply from the auxiliary hopper will enable the apparatus to be used for a few days, long enough to enable the owner to refill the hoppers 4 and 8.

The gas is preferably conducted from the bell 6 to the service pipe S by means of a yieldable pipe connection 7 between the upper portion of the bell and the end of the service pipe in the tank. Preferably I form this connection out of a section hose. One end of this may be gas-tightly connected to an outlet nipple 6ᶜ on the bell, and the other end of this hose may be connected to the end of the service pipe in the tank as at 7ᵇ.

Preferably the points of connection, 6ᶜ and 7ᵇ, of the flexible pipe or hose 7 are almost diametrically opposite so as to provide a sufficient length of hose between said points to permit the free movement up and down of the gas bell without putting any strain upon the yieldable or flexible pipe connection.

Heretofore it has been customary to use metal gas outlet pipes extending from a point within the bell and above the water line through the water below the mouth of the bell and up through the water to the connection with the service pipe outside the bell. Such connections are apt to become cloged either with water or powdered carbid and cause trouble. By using a yieldable, flexible or hose connection above the water level between the upper end of the bell and the service pipes such clogging and choking of the gas outlet pipe is prevented.

The loosely connected self-adjusting conical feed valve in the bottom of the hopper, operated in the manner described, is very useful as I find in practice the apparatus will feed carbid in proper quantities to maintain the gas supply according to the number of burners in use, and such loosely connected valve will readily adjust itself and stop the flow of carbid even if some large particle of carbid should catch between one side of the valve and the edge of the outlet opening.

Heretofore it has been customary to make the container or diaphragm open at the bottom, and the spent carbid or mud runs out into the tank, exterior to the diaphragm and makes the cleaning of the apparatus very troublesome. In my apparatus when it is desired to remove the mud, the cover of the tank is removed, the bell is withdrawn by the aid of any suitable apparatus, such as a windless or tackle, which can be readily obtained, then the hopper is lifted out and then the container 2 is raised out of and above the tank, as indicated in Fig. 3; then the upper end of the discharge pipe 3 is detached from the catch 3ª and lowered so as to permit the water and mud in the container to escape into any desired receptacle.

Preferably the mud in the container is stirred up before lowering the pipe 3, so that the mud will more readily and quickly discharge itself through the outlet pipe 3. After the mud is discharged from the container the latter and pipe 3 may be cleaned by running clear water therethrough; then the free end of the discharge pipe may be fastened back; and the container again lowered into the tank; a proper amount of water is then placed in the container, the hopper 4 is replaced, and the bell lowered to position so as to automatically open the valve and permit the desired amount of carbid to be discharged into the container to generate the gas.

What I claim is:

1. In a carbid gas generating apparatus, the combination of a tank, a bell therein, a feed hopper, a valve for regulating the supply of carbid from the hopper, and means for closing and opening said valve; with an auxiliary hopper having a contracted outlet, a pivoted valve for closing the outlet of the auxiliary hopper, and means adapted to be operated by turning the bell to open the auxiliary hopper valve when the main hopper supply is exhausted.

2. In a carbid gas generating apparatus, the combination of a tank, a bell therein, a feed hopper within the bell, a valve for regulating the supply of carbid from the hopper, means for closing and means for opening said valve; with an auxiliary hopper, a pivoted valve for closing the auxiliary hopper, said pivoted valve having a part projecting out of the feed hopper and a member connected with the bell and adapted to be engaged by the projecting part of the pivoted valve when the bell is turned and open the auxiliary hopper valve.

3. In a carbid gas generating apparatus, the combination of a tank, a bell therein, a feed hopper within the bell, a valve for regulating the supply of carbid from the hopper, means for closing the said valve, and means for opening said valve by the bell; with an auxiliary hopper within the feed hopper, a valve for closing the auxiliary hopper having a part projecting out of the feed hopper and a member connected with the bell adapted to be engaged by the projecting part of the latter valve when the bell is turned and open the auxiliary hopper valve, substantially as described.

In testimony that I claim the foregoing as my own, I affix my signature.

PERCY B. SULLIVAN.